United States Patent [19]

Zhuang

[11] Patent Number: 5,371,207
[45] Date of Patent: Dec. 6, 1994

[54] PRESSURE PRETREATMENT FOR IMPROVING THE ACETYLATION OF CELLULOSE

[75] Inventor: J. Ming Zhuang, Vancouver, Canada

[73] Assignee: Arbokem Inc., Vancouver, Canada

[21] Appl. No.: 17,488

[22] Filed: Feb. 12, 1993

[51] Int. Cl.$^5$ .............................. C08B 3/06; C08B 1/02
[52] U.S. Cl. ........................................ 536/58; 536/59; 536/63; 536/69; 536/70; 536/71
[58] Field of Search ....................... 536/58, 59, 63, 69, 536/70, 71

[56] References Cited

U.S. PATENT DOCUMENTS

| | | | |
|---|---|---|---|
| 2,854,446 | 9/1958 | Robin | 536/71 |
| 2,923,706 | 2/1960 | Campbell et al. | 536/73 |
| 3,631,023 | 12/1971 | Horne et al. | 536/69 |
| 3,755,297 | 8/1973 | Campbell et al. | 536/73 |
| 3,767,642 | 10/1973 | Campbell et al. | 536/69 |
| 3,870,703 | 3/1975 | Gibney et al. | 536/70 |
| 4,016,353 | 4/1977 | Goheen et al. | 536/69 |
| 4,269,972 | 5/1981 | Yabune et al. | 536/71 |
| 4,306,060 | 12/1981 | Ikemoto et al. | 536/69 |
| 4,439,605 | 3/1984 | Yabune et al. | 536/71 |

FOREIGN PATENT DOCUMENTS 565099 10/1958 Canada .

OTHER PUBLICATIONS

Grant & Hackh's Chemical Dictionary McGraw-Hill Book Company New York 1987 p. 578.

*Primary Examiner*—Nathan M. Nutter
*Attorney, Agent, or Firm*—Robert M. Phipps

[57] ABSTRACT

A novel method has been discovered for the pretreatment of cellulose with acetic acid and acetic anhydride under pressure, resulting in uniformly activated cellulose fibers. The improved process for producing cellulose diacetate comprises the steps of: (1) pretreating and activating the fluffed cellulose fibers in a solution of glacial acetic acid and acetic anhydride at room temperature and elevated pressure for a specific time; (2) mixing the activated cellulose containing acetic acid and anhydride further with a mixture of glacial acetic acid, acetic anhydride and sulphuric acid catalyst and acetylating the cellulose at specific initial and end temperatures to form primary cellulose acetate; and (3) partially neutralizing the sulphuric acid catalyst and destroying the excess acetic anhydride by adding an aqueous solution of magnesium acetate with dilute acetic acid to provide an excess of water in the reaction dope for hydrolysis at elevated temperature and pressure conditions.

21 Claims, No Drawings

PRESSURE PRETREATMENT FOR IMPROVING THE ACETYLATION OF CELLULOSE

BACKGROUND OF THE INVENTION

This invention relates to the pretreatment of cellulose fibres under pressure with activating agents by which the fibres become more reactive in subsequent acetylation, followed by hydrolysis and precipitation to produce a high quality product (cellulose diacetate).

Cellulose acetylation is a heterogeneous reaction between the cellulose fibres and acetic anhydride in the presence of a catalyst, e.g., sulphuric acid. The course of the reaction is largely controlled by the diffusion rates of reactant and catalyst into the cellulose fibres after the initial surface esterification. Prior to the acetylation, a pretreatment or chemical activation is usually required, which swells the cellulose fibres and increases the accessibility of the cellulose hydroxyl groups to the acetylating agents.

Filterability of cellulose acetate solution is closely related with the formation of gel particles resulting from the presence of insufficiently activated fibre parts. A good filterability of cellulose acetate solution at a high viscosity level is required for the manufacture of high quality products of cellulose acetate.

Many attempts have been made to examine the activating effects of various pretreating agents (e.g., water, lower fatty acids, methanol, benzene, formamide, pyridine, etc.) and catalysts (e.g., methanesulfonic acid, perchloric acid and sulphuric acid).

According to existing technologies, pretreatment of cellulose is routinely made with acetic acid and a small amount of water. The presence of water accelerates the swelling of the cellulose fibre by acetic acid. The small size and polarity of water molecule can rapidly diffuse into the fibres and disrupt strained secondary valence bonds. This pretreatment method typically comprises a multi-stage process that usually requires special equipment in the following steps: (1) slurrying the cellulose in an acetic acid/water solution; (2) extracting water from the cellulose slurry by a glacial acetic acid wash and centrifuging to remove as much water as possible; and (3) fluffing and uniformly blending the cellulose with a sulphuric acid catalyst prior to entering the acetylation reactor. It may be noted that the viscosity of cellulose is sharply decreased when sulphuric acid catalyst is used even at a low level of less than 2% in the pretreatment step.

Despite such multi-step pretreatment, a small percentage of relatively inactive cellulose is always present. The poorly activated cellulose does not completely convert to desired cellulose triester in the acetylation step. The result is a turbid acetate solution. This problem is particularly acute in using wood pulp with relatively high degree of impurities such as high hemicellulose content.

U.S. Pat. Nos. 4,439,605 and 2,923,706 (and Canadian Patent No. 565,099) teach the minimization of insufficiently activated fibres by acetylation in the higher temperature range of from about 50 deg. to 85 deg. Celsius (or up to the boiling point of acetic acid), leading to the reduce formation of gel particles in cellulose triester. However, these approaches add substantially to the complexity of heating in the acetylation step.

U.S. Pat. Nos. 4,439,605 and 3,767,642 teach that after the complete neutralization of the sulphuric acid catalyst, the hydrolysis is conducted by injecting steam into the reaction mixture to reach higher temperature (up to about 160 deg. Celsius) and pressure (up to about 85 psig) for approximately 2 hours. However, this method usually results in an undesirable yellowish product.

SUMMARY OF INVENTION

It is an object of the present invention to provide an efficient and economical process for the pretreatment of cellulose under pressure, which results in uniformly activated cellulose fibres. This process may be carried out continuously in any mixing device for high viscosity materials.

Further objects of this invention, in providing a modified process for the manufacture of cellulose diacetate, will become apparent hereinafter.

The present invention comprises a process for the pretreatment of cellulose, in which the cellulose fibres are subjected to fluffing prior to activation. The fluffed cellulose (100 parts by wt.) is then immersed in a solution of glacial acetic acid (800 to 2000 parts by wt.) and acetic anhydride (35 to 100 parts by wt.) with moderate stirring for a period of about 15 to 90 minutes under a pressure of 2 to 150 psig and at room temperature. The pressure is maintained with nitrogen, or helium or carbon dioxide or combinations thereof. The time of pretreatment may be shorter at a higher pretreatment temperature.

The acetylating agents, which are composed of acetic anhydride (140 to 300 parts by wt.), glacial acetic acid (0 to 200 parts by wt.) and concentrated sulphuric acid catalyst (3 to 10 parts by wt.), are prechilled to about 5 deg. to 15 deg. Celsius. Then, they are mixed with the above anhydrous pretreated cellulose slurry in an acetylating reactor. The cellulose mixture is heated, partially by the heat of the exothermic acetylation, from an initial temperature of 10 deg. to 28 deg. Celsius to an end temperature of about 35 deg. to 60 deg. Celsius at an approximately constant heat-up rate over a time period of 30 to 60 minutes. The temperature within the acetylating reactor is further maintained at this end temperature for 5 to 40 minutes, for the formation of a clear dope of satisfactory viscosity.

The acetylated dope is then thoroughly and rapidly blended with an aqueous neutralizing salt (e.g., magnesium acetate) and a dilute acetic acid (50% to 70% by wt.) solution. The sulphuric acid concentration is thus reduced to a desired level of 0.1 to 5 parts by wt. The acetylation is terminated by the addition of water to destroy the excess acetic anhydride. Total water addition at a level of 200 to 500 parts by wt. is provided for hydrolysis.

The partially neutralized acetylated dope is hydrolysed at a temperature of about 50 deg. to 100 deg. Celsius under nitrogen pressure of 50 to 150 psig for 1 to 5 hours in an autoclave. The temperature may be maintained by external heating or by injecting steam directly into the reactor. The nitrogen pressure unexpectedly promotes the hydrolysis reaction to uniformly occur in the polymeric cellulose construction of triester, yielding the white product of cellulose diacetate with a loose mass. In the case of no nitrogen pressure, the hydrolysis carried at 75 deg. to 90 deg. Celsius will yield a yellowish product with a poor solubility in acetone due to the gel problem.

The subsequent steps, namely neutralization of all the sulphuric acid, cellulose diacetate precipitation and separation, are followed by the conventional processes. The cellulose fibres may be softwood or hardwood or annual plant materials, high or low viscosity and high or low α-cellulose content chemical pulp. The α-cellulose content of the pulp may be between 88% to 98% and the viscosity of the pulp between 8 mPa.s and 30 mPa.s.

The hydrolysis pressuring gas may be selected from nitrogen, helium and combinations thereof.

The present invention teaches a pressure pretreatment of cellulose fibres, which will activate the cellulose fibres efficiently. As a result, the effect of the varying purities of starting cellulose raw material is greatly reduced. The present method can be practiced simply and economically with a solution comprising glacial acetic acid and acetic anhydride.

DETAILED DESCRIPTION OF THE INVENTION

In the pressure pretreatment, the activating agent can be glacial acetic acid or acetic acid. However, the most reactive cellulose was obtained by using a solution of glacial acetic acid and acetic anhydride, as an activating agent. The pretreated cellulose could be subsequently acetylated uniformly in a shorter time.

The choice of pretreatment conditions (e.g., pressure, temperature, time and the amount of acetic anhydride) depends totally on the nature of cellulose materials. In general, cellulose with properties such as low viscosity, low α-cellulose content and high density should be pretreated with higher pressure, temperature and amount of acetic anhydride for a longer period of time.

A sufficiently reactive cellulose is provided by the above pressure pretreatment in an anhydrous system. The whole system of cellulose slurry can be fed into the acetylating reactor directly. A uniform acetylation of cellulose is then conducted in an energy-saving process under mild operating conditions. In the absence of the exothermic reaction of acetic anhydride with water, the acetylation of cellulose may have an initial temperature of 10 deg. to 28 deg. Celsius. Also, the acetylating agents may be prechilled to about 5 deg. to 15 deg. Celsius. The end temperature of acetylation is controlled in the range of 40 deg. to 60 deg. Celsius. The pretreated cellulose can be completely converted to the cellulose triester to a target level of the degree of polymerization (DP). The smaller DP at the end of acetylation provides the substantially improved filterability and greater control of the subsequent hydrolysis step. A further degradation of the triester will take place at a slower rate in the hydrolysis step. The optimum temperatures used in the acetylation stage depend on the total quantities of acetic anhydride, sulphuric acid and acetic acid and on the cooling capacity of the acetylation reactor.

In order to promote the hydrolysis of triester to cellulose diacetate, an excess amount of water is present in the acetylated dope. The hydrolysis time for triester of a specific pulp is dependent on three major factors: pressure, temperature and the amount of sulphuric acid catalyst. Undesired decrease in the viscosity of cellulose diacetate is avoided by limiting the amount of sulphuric acid to less than 5 percent weight based on cellulose, in hydrolysis process.

The hydrolysis of cellulose triester is accelerated by a small amount of sulphuric acid catalyst under nitrogen pressure of 50 to 150 psig and temperature of 50 deg. to 100 deg. Celsius to form a white cellulose diacetate with a loose mass. This product has a very good solubility in acetone and forms a clear and uniform solution at a high concentration level with a minimum amount of gel. When the hydrolysis is continued under nitrogen pressure of 95 psig and temperature of 80 deg. Celsius, the hydrolysis time for triester of a specific pulp depends on the amount of sulphuric acid. For example, the hydrolysis time is about 4 hours for 2 parts by weight of sulphuric acid, about 3 hours for 3 parts, and about 2 hours for 4 parts. In limiting the degradation effect of sulphuric acid, the amount of residual sulphuric acid is controlled by the specific addition of magnesium acetate, in accordance with the viscosity of the acetylated dope desired.

To disclose more clearly the nature of the present invention, the following laboratory test examples are given and should not be considered as limiting the spirit or scope of the present invention.

The following methods were used to determine the properties of cellulose acetate. Optical solution properties of samples were determined on the unfiltered dope.
Degree of Acetylation
ASTM D-871 (1970, vol.15, p.272).
Viscosity: Determined by a Brookfield viscometer (Model: LVT).
Turbidity: Absorbance at 650 nm of liquid samples was determined by a Perkin Elmer UV/VIS spectrometer (Model: Lambda 3B).
Coefficient of Yellowness
Defined as the difference in transmission between the two wavelengths (650 nm and 450 nm) divided by the transmission at 650 nm. This was measured by using a Perkin Elmer UV/VIS spectrometer (Model: Lambda 3B).

EXAMPLE 1

Softwood sulfite pulp with the properties of α-cellulose 96%, $R_{10}$ 95.1%, $S_{18}$ 2.9%, moisture 5.1%, brightness 95.2, viscosity 22.0 mPa.s and sheet density 0.61 g/cm$^3$, was selected as starting materials in the experiments comparing pressure and normal pretreatment. This pulp (10 parts by wt.) was fluffed and then immersed in a pretreating solution with moderate stirring for 45 minutes under nitrogen pressure of 45 psig (or atmosphere) and room temperature. The pretreating solution was a mixture of glacial acetic acid (180 parts by wt.) and acetic anhydride (3.5 parts by wt.), or glacial acetic acid (180 parts by wt.), or acetic acid (94%, 180 parts by wt.) separately. After pretreatment using a mixture of glacial acetic acid and acetic anhydride, or glacial acetic acid as activating agents, the activated pulp slurry was totally transferred to the acetylator and was mixed with the acetylation solution. In the case of pretreating pulp with acetic acid (94%), the activated pulp was washed by glacial acetic acid (3×70 parts by wt.) prior to acetylation. The acetylation solution was composed of glacial acetic acid (220 parts by wt.), acetic anhydride (25 parts by wt.) and sulphuric acid (1 part by wt.), which included the amounts of each acid remaining in the acetylated pulp slurry.

The acetylation temperature rose from 5 deg. to 40 deg. Celsius at an approximately constant ramp rate in 60 minutes, and then the acetylator was further maintained at 40 deg. Celsius until the viscosity of acetylated dope dropped to 3,500±100 mPa.s. The acetylation time was recorded, and the turbidity of acetylated dope was determined by Perkin Elmer UV/VIS spectrometer and expressed by the absorbance at 650 nm.

The following Table 1 shows the test results. In comparing the results of Experiments 1, 2 and 3 with Experiments 4, 5 and 6, the former had a longer acetylation time than the latter. It is evident that the pressure pretreatment (in Experiments 4, 5 and 6)

TABLE 1

The Effects of Various Pretreatment Conditions

| | Conditions | | | Pretreating Agents (pts. wt.) | | | Acetylation Dope | | |
|---|---|---|---|---|---|---|---|---|---|
| Expt. | Press. (psig) | Temp. (deg. C.) | Time (min.) | Acetic Acid | Acetic Anhydride | Water | Time (min.) | Viscosity (mPa · s) | Turbidity (%) |
| 1 | 0 | 22 | 60 | 180 | NIL | NIL | 220 | 3,600 | 19.8 |
| 2 | 0 | 22 | 60 | 170 | NIL | 10 | 210 | 3,600 | 14.5 |
| 3 | 0 | 22 | 60 | 180 | 3.5 | NIL | 160 | 3,400 | 13.3 |
| 4 | 40 | 22 | 60 | 180 | NIL | NIL | 150 | 3,600 | 13.8 |
| 5 | 40 | 22 | 60 | 170 | NIL | 10 | 120 | 3,600 | 12.3 |
| 6 | 40 | 22 | 60 | 180 | 3.5 | NIL | 110 | 3,400 | 11.5 |

Note:
Press. = gauge pressure can promote the reactivity and accelerate the acetylation of pulp. Additionally, the effects of pretreating agents on the activation of cellulose were determined by comparing the results of Experiments 1, 2 with 3, and Experiments 4, 5 with 6. It is evident that a more reactive pulp can be provided, leading to a rapid acetylation to form the acetylated dope with low turbidity, by using glacial acetic acid and acetic anhydride as pretreating agents in Experiments 3 and 6.

EXAMPLE 2

Softwood sulfite pulp (10 parts by wt.) having the properties of α-cellulose 96%, $R_{10}$ 95.1%, $S_{18}$ 2.9%, moisture 5.1%, brightness 95.2, viscosity 22.0 mPa.s and sheet density 0.61 g/cm³, was fluffed and mixed with a solution of glacial acetic acid (180 parts by wt.) and acetic anhydride (9 parts by wt.) in an autoclave, then pressurized by nitrogen pressure (75 psig) at room temperature for 45 minutes. The resulting pulp slurry was totally transferred to the acetylator, mixed with a solution of glacial acetic acid (35 parts by wt.), acetic anhydride (20 parts by wt.) and sulphuric acid (0.85 part by wt.). The acetylation temperature rose from about 18 deg. to 45 deg. Celsius over a period of 60 minutes, and the acetylator was further maintained at 45 deg. to 50 deg. Celsius until a desired viscosity of the acetylated dope was reached.

The acetylation was terminated by adding a mixture solution of dilute acetic acid (50%, 80 parts by wt.) and an aqueous magnesium acetate solution (50%, 1.55 parts by wt.) under vigorous agitation. The sulphuric acid catalyst was partially neutralized to about 3.2 percent weight based on pulp. Then, the reaction dope was introduced to an autoclave for hydrolysis. Under nitrogen pressure (95 psig) and 78 deg. Celsius, the hydrolysis reaction was continued for 3 hours. Primary acetate dope was hydrolysed to secondary acetate. Followed by complete neutralization with an excess of about 3% magnesium acetate aqueous solution, precipitation in a dilute aqueous acetic acid solution, washing with deionized water and drying, a white product of cellulose diacetate with a loose mass was obtained. This product was found to have the following characteristics:

| Combined acetic acid | 54.3% |
|---|---|
| Acidity | 0.07% |
| Viscosity | 28,000 mPa · s (in 20 wt. % solution of 90% acetone/10% ethanol) |
| Turbidity | 7.9 (in 6 wt. % solution of 95% acetone/5% water) |
| Coefficient of yellowness | 0.060 (the same sample used for turbidity test) |
| Solubility in acetone | excellent |

It is evident that the product prepared in accordance to the present invention is an excellent material for the manufacture of high quality cellulose diacetate.

EXAMPLE 3

Hardwood sulphate pulp (10 parts by wt.) having the properties of $R_{10}$ 97.7%, $S_{18}$ 1.1%, moisture 6.0%, brightness 94.0, viscosity 12.1 mPa.s and sheet density 0.61 g/cm³, was fluffed and then mixed with a solution of glacial acetic acid (180 parts by wt.) and acetic anhydride (9 parts by wt.) in an autoclave under nitrogen pressure (75 psig) and room temperature for 45 minutes. The resulting pulp slurry was totally charged to the acetylator, mixed with a mixture solution of glacial acetic acid (35 parts by wt.), acetic anhydride (20 parts by wt.) and sulphuric acid (0.85 part by wt.). The cellulose was acetylated for approximately 60 minutes with a gradually increasing temperature profile from about 22 deg. to 45 deg. Celsius, and the acetylator was further maintained at 45 deg. to 50 deg. Celsius until a desired viscosity of the acetylated dope was reached.

The acetylated dope was rapidly blended with an added mixture solution of dilute acetic acid (50%, 90 parts by wt.) and an aqueous magnesium acetate solution (50%, 1.50 parts by wt.). Thus, the acetylation was terminated, and the sulphuric acid catalyst was partially neutralized to about 3.3 percent weight based on pulp. The partially neutralized acetylated dope was introduced to an autoclave for hydrolysis. Under nitrogen pressure (95 psig) and 78 deg. Celsius, the hydrolysis reaction was continued for 2.5 hours. Primary acetate dope was hydrolysed to secondary acetate. Followed by complete neutralization with magnesium acetate aqueous solution, precipitation in a dilute aqueous acetic acid solution, washing with deionized water and drying, a white product of cellulose diacetate with a loose mass was obtained. This product was found to have the following characteristics:

| Combined acetic acid | 54.3% |
|---|---|
| Acidity | 0.08% |
| Viscosity | 32,500 mPa · s (in 20 wt. % solution of 90% acetone/10% ethanol) |
| Turbidity | 9.5 (in 6 wt. % solution of 95% acetone/5% water) |
| Coefficient of yellowness | 0.175 (the same sample used for turbidity test) |
| Solubility in acetone | excellent |

It is shown that the present invention is equally useful for the processing of hardwood sulphate pulps.

EXAMPLE 4

Softwood sulfite pulp (10 parts by wt.), having the properties of α-cellulose 93%, $R_{10}$ 92.1%, $S_{18}$ 5.6%, moisture 5.0%, brightness 91.5, viscosity 9.52 mPa.s and sheet density 0.79 g/cm³, was fluffed and pretreated in a solution of glacial acetic acid (180 parts by wt.) and acetic anhydride (10 parts by wt.) in an autoclave under nitrogen pressure (90 psig) and 40 deg. Celsius for 40 minutes. The activated pulp slurry was mixed with an acetylation solution of glacial acetic acid (35 parts by wt.), acetic anhydride (20 parts by wt.) and sulphuric acid (0.85 part by wt.) in the acetylator. The acetylation temperature rose from about 22 deg. to 50 deg. Celsius over a period of 60 minutes, and the acetylator was further maintained at 50 deg. to 55 deg. Celsius until a desired viscosity of the acetylated dope was reached.

The acetylated dope was rapidly blended with an added mixture solution of dilute acetic acid (50%, 90 parts by wt.) and an aqueous magnesium acetate solution (50%, 1.30 parts by wt.). Thus, the acetylation was terminated, and the sulphuric acid catalyst was partially neutralized to about 4.0 percent weight based on pulp. Then, the reaction dope was introduced to an autoclave for hydrolysis. Under nitrogen pressure (100 psig) and 78 deg. Celsius, the hydrolysis reaction was continued for 3.5 hours. Primary acetate dope was hydrolysed to secondary acetate. Followed by complete neutralization, precipitation, washing and drying, a white product of cellulose diacetate with a loose mass was obtained. This product was found to have the following characteristics:

| | |
|---|---|
| Combined acetic acid | 54.2% |
| Acidity | 0.06% |
| Viscosity | 29,500 mPa · s (in 20 wt. % solution of 90% acetone/10% ethanol) |
| Turbidity | 8.4 (in 6 wt. % solution of 95% acetone/5% water) |
| Coefficient of yellowness | 0.188 (the same sample used for turbidity test) |
| Solubility in acetone | excellent |

In comparing with the product prepared in Example 2, the present invention can effectively process a pulp with low α-cellulose content, low viscosity and high sheet density to a satisfactory quality cellulose acetate.

The embodiments of the invention in which an exclusive property or privilege is claimed are defined as follows:

1. A process for producing cellulose diacetate from a pulp comprising the steps of:
    a) pretreating and activating fluffed cellulose fibres (10 parts by wt.) in a pretreatment solution of glacial acetic acid (80–200 parts by wt.) and acetic anhydride (3.5–10 parts by wt.) at a pretreatment temperature of 15° C. to 40° C. and a pretreatment pressure of 2 to 150 psig for 15 to 90 minutes to form activated cellulose:
    b) mixing the activated cellulose containing acetic acid and anhydride further with an acetylation solution, the acetylation solution a mixture of glacial acetic acid (0–35 parts by wt.), acetic anhydride (14–30 parts by wt.) and sulphuric acid catalyst (0.3–1.0 parts by wt.), and acetylating the cellulose at an initial acetylation temperature of 10° C. to 28° C. and an end acetylation temperature of 35° C. to 60° C. to yield primary cellulose acetate; and
    c) partially neutralizing the sulphuric acid catalyst to a residual range of 0.1 to 5 parts by wt. and destroying the residual acetic anhydride by adding an aqueous solution of a neutralizing salt with dilute (50% to 70% by wt.) acetic acid to provide excess water (20 to 50 parts by wt.) in the reaction dope for hydrolysis to occur at a hydrolysis temperature of 50° C. to 100° C. and a hydrolysis pressure of 50 to 150 psig.

2. The process according to claim 1 in which the cellulose fibres may be softwood or hardwood or annual plant materials, high or low viscosity and high or low α-cellulose content, chemical pulp.

3. The process according to claim 1 in which the pulp is made by either a sulphite or a sulphate process.

4. The process according to claim 1 in which the α-cellulose content of the pulp is between 88% to 98%.

5. The process according to claim 1 in which the viscosity of the pulp is between 8 mPa.s to 30 mPa.s.

6. The process according to claim 1 in which the pretreatment time is 30 to 45 minutes.

7. The process according to claim 1 in which the pretreatment pressure is 70 psig to 100 psig.

8. The process according to claim 1 in which the pretreatment temperature is 18° C. to 40° C.

9. The process according to claim 1 in which a pretreatment pressuring gas is selected from nitrogen, helium, carbon dioxide and combinations thereof.

10. The process according to claim 1 in which the initial acetylation temperature is 16° C. to 24° C.

11. The process according to claim 10 in which the end acetylation temperature is 45° C. to 55° C.

12. The process according to claim 1 in which the hydrolysis reaction temperature is effected between 75° C. to 100° C.

13. The process according to claim 1 in which the hydrolysis pressure is maintained between 90 to 120 psig.

14. The process according to claim 1 in which the excess water for hydrolysis is controlled effectively between 20% and 30% water in the reaction mixture.

15. The process according to claim 1 in which the hydrolysis pressuring gas over the reaction mixture of hydrolysis is selected from nitrogen, helium and combinations thereof.

16. The process according to claim 1 in which the residual sulphuric acid is maintained between 3% and 4.5% based on the dry weight of cellulose pulp.

17. The process according to claim 1 where the neutralizing salt is magnesium acetate.

18. The process according to claim 1 in which the pretreatment solution consists of glacial acetic acid (160–180 parts by wt.) and acetic anhydride (9–10 parts by wt.).

19. The process according to claim 1 in which the activated cellulose and pretreatment solution directly mix with an acetylation solution of glacial acetic acid (30–35 parts by wt.), acetic anhydride (20 parts by wt.) and sulphuric acid (0.85 parts by wt.) at an initial acetylation temperature of 16° C. to 24° C.

20. A process for producing cellulose diacetate from a pulp comprising the steps of:
    a) pretreating and activating fluffed cellulose fibres (10 parts by wt.) in a pretreatment solution of glacial acetic acid (160–180 parts by wt.) and acetic anhydride (9–10 parts by wt.) at a pretreatment temperature of 18° C. to 40° C. and a pretreatment pressure of 70 to 100 psig for 30 to 45 minutes to form activated cellulose;

b) mixing the activated cellulose containing acetic acid and an-hydride further with an acetylation solution, the acetylation solution a mixture of glacial acetic acid (0-35 parts by wt.), acetic anhydride (14-30 parts by wt.) and sulphuric acid catalyst (0.3-1.0 parts by wt.), and acetylating the cellulose at an initial acetylation temperature of 10° C. to 28° C. and an end acetylation temperature of 35° C. to 60° C. to yield primary cellulose acetate; and c) partially neutralizing the sulphuric acid catalyst to a residual range of 0.1% to 5.0% parts by wt. and destroying the residual acetic anhydride by adding an aqueous solution of a neutralizing salt (50% by wt.) with dilute (50% to 70% by wt.) acetic acid to provide excess water (20 to 50 parts by wt.) in the reaction dope for hydrolysis to occur at a hydrolysis temperature of 50° C. to 100° C. and a hydrolysis pressure of 50 to 150 psig.

21. A process for the pretreatment of cellulose fibres to form activated cellulose comprising mixing fluffed cellulose fibres in a pretreatment solution of glacial acetic acid and acetic anhydride at a pretreatment temperature of 15° C. to 40° C. and a pretreatment pressure of 2 to 150 psig.

* * * * *